Nov. 28, 1950 A. L. HOLCOMB 2,532,098

AUTOMATIC SOUND REPRODUCING CONTROL SYSTEM

Filed March 23, 1948 2 Sheets-Sheet 1

INVENTOR
A. L. HOLCOMB
BY
D. MacKenzie
AGENT

AUTOMATIC SOUND REPRODUCING CONTROL SYSTEM

Filed March 23, 1948 2 Sheets-Sheet 2

INVENTOR
A. L. HOLCOMB
BY
D. MacKenzie
AGENT

Patented Nov. 28, 1950 2,532,098

UNITED STATES PATENT OFFICE 2,532,098

AUTOMATIC SOUND REPRODUCING CONTROL SYSTEM

Arthur L. Holcomb, Tarzana, Calif., assignor to Western Electric Company, Incorporated, New York, N. Y., a corporation of New York Application March 23, 1948, Serial No. 16,488

14 Claims. (Cl. 179—100.1)

This invention relates particularly to an improved system of apparatus for the automatic control of sound reproduction. The invention is equally applicable to the automatic control of the movement of any object in accordance with a prearranged sequence; one example being the continuous control of the mixer setting which determines the level of sound reproduction from a sound record of any type, while another example is the steering of a vessel in accordance with a predetermined time schedule.

The general object of the invention is therefore to provide an improved apparatus for automatically controlling a condition in accordance with a time schedule previously selected.

The invention finds immediate application in the rerecording of sound records, so that one of its objects is to facilitate the automatic rerecording of such records with the desired sequence of the sound level changes from the levels originally recorded.

Another object is to provide a control record of such desired sequence which will be simple to make and to amend if necessary. This control record consists of a trace on a record tape advanced at uniform speed under a marking device, a pencil for example, which is moved laterally of the tape in accordance with the varying setting of a mixer shaft manually controlled in the first reproduction of the sound record, which is a rehearsal to determine what changes in sound level are desirable.

The practice of the sound picture art and the utility of dubbing an original sound record to produce an improved record are well known, being set forth in numerous publications, one being my United States Patent 2,338,766, January 11, 1944, assigned to the same assignee as the present invention.

The sound record, whether on film, on disc or on magnetic tape, is advanced past its point of reproduction concurrently with the tape receiving the sound control record so that the lateral position thereon of the pencil trace indicates the mixer shaft position, hence the reproducing gain at corresponding instants on the sound record and on the control record. Since the latter record is a pencil trace it may be erased and amended.

The marker position is near one edge of the tape when the reproducing mixer is set to cut off the reproduction completely, near the other edge when the mixer is set for zero attenuation. At any line transverse to the control record the distance of the trace from the edge of zero attenuation corresponds to the mixer attenuation for the corresponding transverse element of the sound film or the corresponding point in the groove of the disc record, whichever is the type of sound record being reproduced.

To use the sinuous trace for controlling the mixer shaft position in later reproduction, the lateral position of the trace is scanned by an optical system which continuously recognizes the trace position and translates the recognition into an electrical signal. This signal is then supplied to an electrical system which in effect measures the distances transversely of the control record between the limit positions thereon and the instantaneous marker position, compares these distances, and in accordance with their difference, positions a dubbing mixer shaft to duplicate the corresponding shaft position manually set in rehearsal.

Two further objects of the invention, then, are to provide the novel optical scanning system and the novel electrical system, respectively, above mentioned and later herein described in detail.

From the later description, it will be realized that the control record may be arbitrary or may represent the varying angular position of a shaft of any kind, and the shaft controlled by the optical scanning and electrical evaluating means may be associated with any type of apparatus remote or not from the former shaft in space or in time. Therefore, another object of the invention is to provide an improved system of apparatus for automatically controlling one apparatus in correspondence with a record of the earlier or simultaneous condition of another apparatus, or to control the one apparatus in accordance with a predetermined prescription.

The invention will be understood from the following description of its application to the automatic dubbing of a film sound record, reference being made to the accompanying drawings in which.

In all figures, like numerals designate like elements.

Figure 1A:
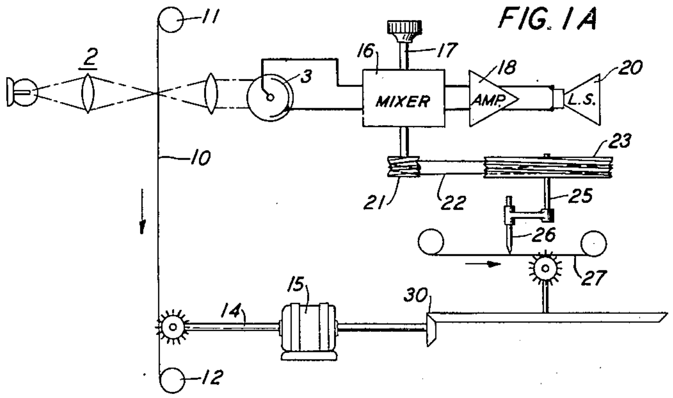
Fig.1A shows diagrammatically the apparatus for reproducing a sound film in rehearsal and making a record of the accompanying mixer settings.

Referring now to Fig. 1A the sound film 10 is sprocket driven in the usual manner from feed-reel 11 to take-up reel 12 by shaft 14 of motor 15, the film speed being the standard 18 inches per second. A conventional optical system 2 illuminates the film over a narrow transverse element, through which a fraction of the incident light is transmitted and collected to fall on photocell 3. Thence, an electrical current representing the recorded sound is transmitted through mixer 16, wherein the amplitude is varied if necessary by manual control of mixer shaft 17, to reproducing amplifier 18. The output current of amplifier 18 is applied to drive loudspeaker 20. All the elements so far mentioned are conventional and require no detailed description.

In this rehearsal, the mixer shaft is manually operated to secure the desired level changes and is made to drive an arm which sweeps a pencil over the surface of a traveling paper tape.

Mixer shaft 17 is extended downward to carry pulley 21, connected by a continuous wire belt 22 to pulley 23, four times the diameter of pulley 21. Belt 22 is wrapped two and a half times around and is permanently fastened to each pulley so that slippage is avoided. Pulleys 21 and 23 may be turned with a screw thread to receive belt 22 in a manner preventing axial slippage. A complete rotation of shaft 17 then causes a 90° rotation of shaft 25 of pulley 23. Carried on shaft 25 is marker 26, a pencil for example, whereby a trace is made on a paper tape 27, sprocket driven through gearing 30 from an extension of shaft 14 at a convenient fraction of film speed, say one-tenth.

Since the mixer shaft moves, from one extreme position to another, through an angle less than 360 degrees, it is convenient to gear down the pencil-carrying arm by a ratio of 4 to 1 and to give the arm a radius of about 1⅜ inch. The mixer shaft and that of the pencil arm can then be coupled by a wire belt so fastened to each shaft that the center of the maximum traverse of the mixer shaft will correspond to a pencil position at the lengthwise center line of a paper tape 2½ inches wide traveling under the pencil at one-tenth film speed. The tape is propelled by sprockets operating in perforations between the lines of which the pencil is permitted to move, tracing (on a stationary tape) an arc of a little less than 90 degrees and having a chord of 1⅞ inch between limits.

As the tape and film are advanced during rehearsal, the mixer dial continuously controlling the reproduced sound level, the pencil traces on the tape a black line ranging from near one set of perforations at mixer position "off" to near the other set at zero attenuation. The lateral position of the pencil point then continuously represents the mixer setting at the corresponding moment of the sound film. The pencil trace is about thirty mils wide.

Figure 1B:
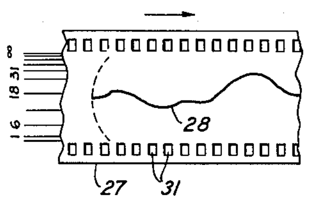
Fig. 1B is a top view of a fragment of the control record made in the rehearsal.

The volume control record so obtained is illustrated in Fig. 1B. Tape 27 bears a black line 28 which is the record of mixer shaft positions during rehearsal. Perforations 31 may have the same spacing as the sprocket holes of the sound film. The scale at the left of Fig. 1B shows in decibels the attenuation introduced by a typical mixer corresponding to the lateral position of the marker 26.

Figure 2:
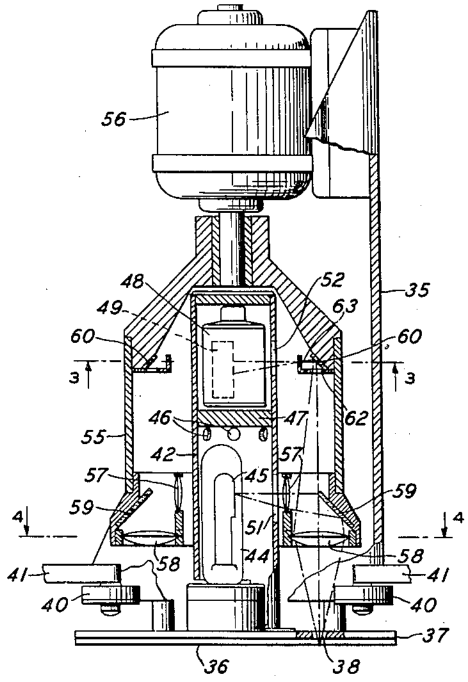
Fig. 2 shows in lengthwise section the optical assembly, including the photoelectric cell, which scans the control record shown in Fig. 1A.

In order to use the record of Fig. 1B to control a subsequent reproduction of film 10, a scanning system is provided which is shown in Fig. 2. A bracket 35, shown in Fig. 2 partly broken away, is mounted rigidly on an opaque face plate 36 in which is cut a channel 37 of convenient depth and of width to receive record 27. An arcuate slit 38, extending over an arc of 90 degrees, is provided in the body of plate 36 and extends therethrough from the bottom of the channel. The slit is made to correspond in location and in radius to the travel of marker 26, Fig. 1A.

It is convenient to show the assembly of Fig. 2 with plate 36 at the bottom, but in use plate 36 would probably be set into a suitable opening in a table top, at such a depth that the bottom of channel 37 is flush with the upper surface of the table. Then the paper record 27 may be progressed through channel 37 with the record line 28 next to the bottom of the channel so that an element of it, 28', Fig. 4, may be scanned through slit 38 by the optical system now to be described.

Figure 3:
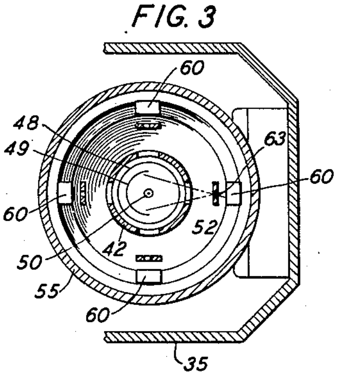
Fig. 3 is a transverse sectional view of the assembly shown in Fig. 2, taken on the line 3—3 thereof.

Plate 36 and bracket 35 are resiliently supported, by suitable mountings 40 at each corner, from a framework 41 of any desired kind. Rigidly mounted on the face of plate 37 opposite the channeled face is an opaque cylinder 42 centered on plate 37. Within this cylinder are mounted lamp 44 in such position that its filament 45 is vertically aligned above the center of curvature of slit 38. Ventilating holes such as 46 are provided in cylinder 42. Above (in the drawing) these holes is an opaque partition supporting, by means not shown, photoelectric cell 48 provided with a semicylindrical cathode 49. The axis of cathode 49 is aligned with filament 45, and on this axis is found anode 50 (Fig. 3).

Light from filament 45 passes through an aperture 51 in cylinder 42, and a portion of this light reflected from the trace-bearing surface of tape 27 is directed to reach cathode 49 through an aperture 52 aligned with aperture 51. To bring this about, a cylindrical shell 55 is rotated by motor 56 about the axis of cylinder 42. Motor 56, rigidly supported from bracket 35, is suitably a 3-phase synchronous motor such as the Bodine Type NYP-34, running at 1800 revolutions per minute when supplied with 60-cycle current.

Figure 4:
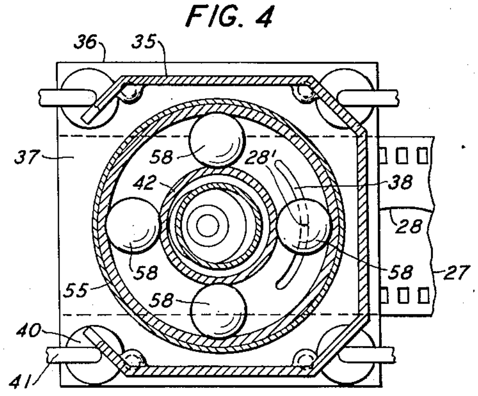
Fig. 4 is a plan view taken from the level of line 4—4 in Fig. 2.

Carried internally of shell 55 are four optical systems at 90 degree spacing about the axis of the shell; two are shown in Fig. 2, while in Fig. 4 all are indicated. Each optical system comprises lenses 57 and 58, of which the optical axes are respectively perpendicular and parallel to the surface of channel 37, with front-surface mirrors 59 and 60 each inclined as shown 45 degrees to that surface. It will be noted that each mirror 59 intercepts no more than half the light through lens 57 and reflects this light to fall through slit 38 on record trace 28, the light being thereon focussed by the combined action of lenses 57 and 58. The optical axis of lens 58 passes through slit 38 normally to the plane of channel 37, through which record 27 is progressed by means similar to those which enabled the record to be made.

Aperture 51 and lenses 58 are made large enough to permit the illumination of slit 38 by one lens 58 to overlap slightly that by another, so that motor 56 at 1800 revolutions per minute on 60-cycle current causes slit 38 to be scanned throughout its extent 120 times per second, or generally, once in each half cycle of the voltage supplied to motor 56. It will be understood that any convenient frequency may be used.

Aligned with the optical axis of each lens 58 and with the corresponding mirror 60 is a horizontal aperture in a small bracket 62, an upturned part of which is provided with an aperture 63 shown best in Fig. 3. Light reflected from record 27 is converged by lens 58 to a focus on aperture 63. The portion of the reflected light that passes the inner edge of mirror 59, passes then through the horizontal aperture in bracket 62 and is reflected by mirror 60 to its focus, thereafter diverging to cathode 49. The size of aperture 63 corresponds to a circle of 30 mils diameter at the plane of trace 28.

Lamps, lenses, mirrors and photocells such as are here required are commercial articles not here necessary to specify. The outer diameter of shell 55, at the level of line 3—3 of Fig. 2, is conveniently 3.375 inches; from this the other dimensions are readily estimated in Fig. 2.

Figure 5:
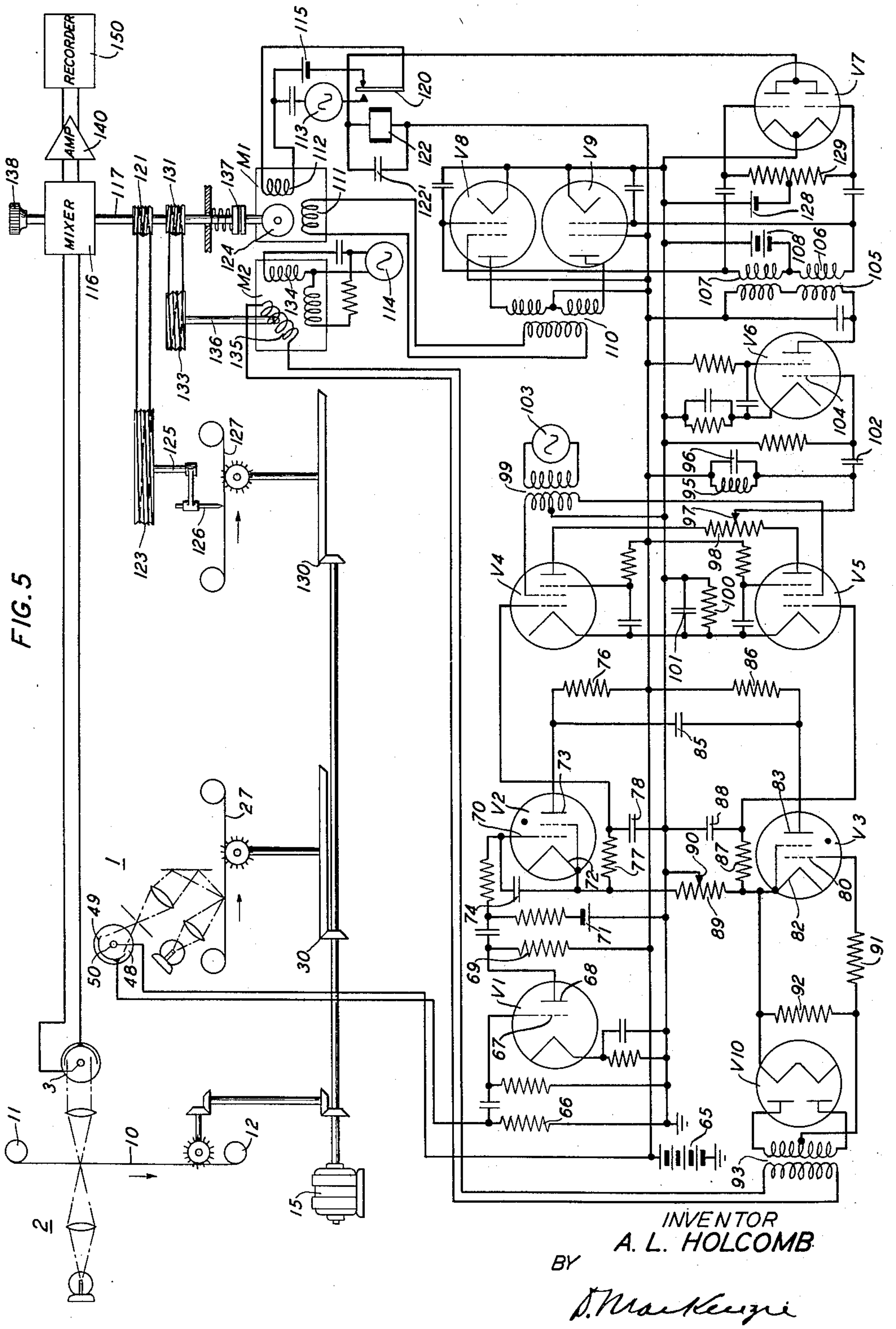
Fig. 5 is a diagram of the electrical and mechanical system which controls the dubbing mixer in accordance with the record of Fig. 1A.

Sources of current for motor 15, motor 56, cell 49 and lamp 44 are understood but not shown, as is also cathode heating for the tubes shown in Fig. 5.

The rotor of the synchronous motor driving the four optical systems is arranged to be mechanically so related to those systems that the light beam of one of them, focused on the paper through the slit, enters the slit at a zero of the supply voltage, leaving the slit at the next voltage zero a half cycle later. There is a little overlap of the light of one optical system over that of another, so that the scanning of the mixer trace is continuous. Thus the whole slit is scanned through each half cycle, the beginning and the end of the scanning coinciding with the like instants of the half cycle. Of course, the lamp filament is supplied with direct current.

The photocell which receives light reflected from the paper tape is capacity coupled to a single stage amplifier in conventional manner. A steady current in the cell is abruptly reduced when the black trace is reached by any of the optical systems. Then occurs a positive voltage impulse at the anode of the amplifying tube. Since the arc of the scanning slot is about 1.08 inches, the diameter of the spot scanned 30 mils and the time of one scanning of the slot $^1/_{120}$ second, the light interruption lasts for less than $^1/_{4000}$ second.

The positive anode pulse is, through a condenser, impressed on the control grid of a thyratron (2D21). This grid is normally biased 10 volts negative and so the thyratron is not conducting until the positive pulse appears. The thyratron then fires and continues conducting until the end of the scan, when it is extinguished by the interference of another and similar thyratron. The portion of the half cycle during which the first tube is conducting is a measure of the distance (on the arc of the scanning slit) between the pencil trace at that instant of tape travel and the end of the slit. If the direction of scanning is from the position of mixer cut-off to that of zero attenuation, this fraction represents the mixer setting below zero attenuation. The fraction is to be measured electrically and used to control the level of the sound record being reproduced as the paper record is scanned.

In place of the thyratrons, cold cathode tubes may be used in a connection described by S. B. Ingram in Electrical Engineering, vol. 58, p. 342, July 1939. Likewise, one may adapt to the present purpose the Eccles-Jordan trigger circuit disclosed in British Patent 148,582, August 5, 1920.

Referring now to Fig. 5, sound film 10 is shown being reproduced for rerecording under control of mixer record 27. Record 27 is scanned by the apparatus of Fig. 2, here symbolically shown and generally designated by numeral 1. Photoelectric cell 48 is continuously illuminated except that in each half cycle there is a momentary interruption when the image of an element of record 28 appears at aperture 63, Fig. 3.

Anode 50 of cell 48 is supplied with +275 volts from a direct current source such as battery 65, while resistor 66 is in series between cathode 49 and ground. A conventional circuit applies the voltage across resistor 66 to the input circuit of amplifying tube $V_1$, which may be any suitable triode. The abrupt reduction in photocell current each time trace 28 is scanned causes a negative voltage pulse at grid 67, hence an amplified positive pulse at anode 68, of tube $V_1$. Anode 68, supplied through resistor 69 from voltage source 65, is resistance-capacity coupled to control grid 70 of a thyratron $V_2$, which grid is negatively biased by battery 71 to allow $V_2$ to become conducting only when the positive voltage pulse is received from anode 68. $V_2$ is suitably a 2D21. A condenser 74 of small capacity is connected between grid 70 and cathode 72 of $V_2$ to limit the response of that tube at very high frequencies, and a steep wave front for the voltage pulse on grid 70 is assured by properly choosing, in accordance with well-known rules, the coupling resistances and capacities between cell 48 and tube $V_1$ and between $V_1$ and $V_2$.

Tube $V_3$, also a 2D21, is provided. Condenser 85 connects anodes 73 of $V_2$ and 83 of $V_3$, which are supplied from source 65 through resistors 76 and 86, respectively. Cathodes 72 and 82 are connected by resistor 89, on which the effective mid-point is grounded by adjustable tap 90. In shunt to ground across the respective portions of resistor 89 are the resistance-capacity circuits 77—78 and 87—88.

Between control grid 80 and cathode 82 of $V_3$, with resistor 91 in series, is applied the voltage across resistor 92. A double diode $V_{10}$ provides full wave rectification without filtering of a 60-cycle voltage received from a phase-controlling element later described, supplied through transformer 93. Resistor 92 is connected between the joined cathodes of $V_{10}$ and the mid-point of the secondary winding of transformer 93. Since there is no filtering, the voltage across resistor 92 drives grid 80 far negative except at the end of each half cycle when the rectified voltage approaches zero; when the negative voltage on grid 80 is less than 2½ volts, tube $V_3$ can fire.

Inasmuch as anodes 73 and 83 are connected by condenser 85, the firing of either $V_2$ or $V_3$ extinguishes the other. Tube $V_3$ is fired at the beginning of each half cycle and continues conducting until the scanning system 1 encounters an element of the trace 28, when $V_2$ is fired and extinguishes $V_3$. $V_2$ then continues to conduct throughout the remainder of the half cycle, at the end of which it is itself extinguished when $V_3$ is again fired. The conducting interval of $V_3$ is thus a measure of the distance of an element of trace 28 from the beginning of the scan; that is, of the mixer setting above cut-off.

Whatever the relative conducting intervals of tubes $V_2$ and $V_3$, their cathode current, flowing in the corresponding parts of the resistance joining the cathodes, charge condensers 78 and 88 through resistors 77 and 78 respectively. The time constants R77C78 and R87C88 are chosen equal and of such value that the voltages across C78 and C88 are proportional to the average currents in $V_2$ or $V_3$, respectively, over an interval of three complete scannings, that is, over $^1/_{40}$ second, if the frequency of the voltage supply is 60 cycles.

Assuming then the pencil trace to be momentarily laterally central of the tape and the voltage phases at motor 56 (Fig. 2) and on the rectifier $V_{10}$ to be the same or exactly the opposite, $V_3$ will fire at the beginning of a scan and be extinguished at the center thereof by the firing of $V_2$ consequent on the sudden reduction in light reflected to the photocell as the trace-slit intersection is scanned. $V_2$ will continue conductive to the end of the scan and will then be extinguished by the firing of $V_3$ when the rectified voltage is zero. Accordingly, the conducting intervals of $V_2$ and $V_3$ are equal and the voltages across condensers C78 and C88 are the same in magnitude and in polarity to ground. Tap 90 may be adjusted to insure this condition.

It will be noticed that if the conducting times of $V_2$ and $V_3$ are unequal, the (positive) voltages on condensers 78 and 88 are different and vary from equality in opposite directions by the same amount, since the increase in conducting time of one thyratron equals the decrease in conducting time of the other.

The voltages of condensers 78 and 88, whatever their values, are applied individually to the first control grids of two 6L7's, tubes $V_4$ and $V_5$, in each of which two control grids are used, the screen grids being capacitively coupled to the respective cathodes and supplied through equal resistors from the supply voltage source 65 which supplies the anodes through an antiresonant circuit (inductance 95 and condenser 96) and through tap 97 on resistance 98 joining the anodes. The second control grids are connected in push-pull to the 60-cycle voltage supply 103 through transformer 99. The antiresonant circuit is tuned to 60 cycles to make the anode circuit impedance high at this frequency and low at other frequencies. Tap 97 on resistance 98 between the anodes is adjusted to balance the tubes if their transconductances differ. A constant bias of the first grids is obtained by voltage drop across resistor 100, the current in which is constant since the first grid voltages vary equally and oppositely.

In these tubes, the second grid voltages vary equally and oppositely, the cathodes are joined to ground through a common resistor 100 with a bypass condenser 101, and suitable grid bias is obtained from the voltage drop across the cathode resistor; this bias is made such that the first grids are never driven positive to the cathodes by the maximum positive voltage permitted to appear on the equal condensers 78 and 88.

If condensers 78 and 88 are charged to equal direct current voltages (which is the case when tubes $V_2$ and $V_3$ conduct during equal time intervals), the conductances of tubes $V_4$ and $V_5$ are equal, or may be made so by adjustment of tap 97 on resistor 98. The 60-cycle voltage from source 103 is applied in push-pull to the second grids of tubes $V_4$ and $V_5$; equal alternating currents flow in opposite phase in these tubes, and no variation takes place in the potential to ground of tap 97. If the voltages of condensers 78 and 88 become unequal, the equality of the alternating currents in tubes $V_4$ and $V_5$ is destroyed and a 60-cycle voltage to ground appears at tap 97; its amplitude is proportional to the difference in voltage of condensers 78 and 88 and its phase depends on which of these condensers has the higher voltage. In this way the circuit of Fig. 5 enables the difference in conducting intervals of tubes $V_2$ and $V_3$, represented initially by a comparatively small direct current voltage difference, to appear as an alternating voltage of amplitude and phase corresponding respectively to the magnitude and sign of that difference. The departure of trace 28 from the center line of sheet 27 thus is represented by an alternating voltage capable of being amplified as desired in tube $V_6$.

Unequal conducting intervals of $V_2$ and $V_3$ produce an alternating voltage to ground at balancing tap 97 and this voltage is applied through condenser 102 to grid 104 of $V_6$, a medium power pentode, its anode supplied from source 65 as are $V_4$ and $V_5$ except that the antiresonant anode circuit includes here a tuned transformer 105, the secondary voltage of which controls a servo system to restore the balance of tubes $V_2$ and $V_3$ and in doing so to drive a motor M1 turning shaft 117 of mixer 116 which is now regulating the reproduced sound level. The secondary of the tuned transformer 105 has two coils 106, 107 in series and to their junction a potential of −30 volts is supplied from source 108, so that grids to which the secondary terminals are connected are normally biased negatively by this voltage. The phase of the alternating voltage between the secondary terminals reverses as the unbalance of $V_2$ and $V_3$ changes sign, and the amplitude of this voltage is proportional to the unbalance.

The secondary voltage of transformer 105 is applied between the control grids of tubes $V_8$ and $V_9$, which are power pentodes such as the 6L6. Their cathodes are connected together directly to ground, while their anodes are joined by the two primary windings in series of transformer 110; anode voltage is supplied to the junction of these windings. The secondary of transformer 110 is a single winding connected in series with field winding 111 of a spinner type motor M1.

Tubes $V_8$ and $V_9$ operate as class B amplifiers, wherefore they are conducting only alternately, one in each half cycle of the secondary voltage from transformer 105. Current flows alternately in the two primary windings of transformer 110, alternating in direction with respect to the secondary winding thereof. There results a 60-cycle alternating voltage in the motor field winding 111, of amplitude proportional to the unbalance of tubes $V_2$ and $V_3$ and of phase dependent on the sign of this unbalance.

A 60-cycle alternating voltage of constant phase is supplied from source 113, the same in phase as source 103, only when there is an unbalance signal from transformer 105, to the other field winding 112 of motor M1. Winding 112 is connected to a direct current voltage source 115 when there is no unbalance and hence no current in field winding 111. The connection is shifted by a relay armature 120 from the direct current source to the alternating current supply by the action of V7 as explained later.

As shown in the drawing, armature 120 is in the position corresponding to no unbalance signal from the secondary terminals of transformer 105; this is the case when the conducting intervals of tubes $V_2$ and $V_3$ are equal, that is, when the trace 28 appears in the center of slit 38, Fig. 4. In this situation, winding 112 is supplied with direct current from source 115, there is no current in winding 111 and the rotor of motor M1 is at rest. Shaft 117 of mixer 116 is connected to this rotor and by previous adjustment is arranged to set mixer 116 at the attenuation corresponding to the setting of mixer 16, Fig. 1A, which places marker 26 at the center line of record sheet 27. The sound currents from photocell 3 then leave mixer 116 at the same level as from mixer 16, Fig. 1A, in the earlier reproduction of film 10; they are suitably amplified by amplifier 140 and fed to recorder 150, which may be of any desired type.

Controlled by shaft 117, through pulleys 121 and 131 respectively, are pulleys 123 and 133, in the same manner as pulley 23 is controlled by pulley 21 in Fig. 1A. The diameters of pulleys 121 and 131 are the same, while pulley 123 has four times and pulley 133 two times this diameter. Rotation of shaft 117 then produces correspondingly reduced rotations of pulleys 123 and 133. Turning with pulley 123 is shaft 125 carrying marker 126 to make a new mixer record on tape 127, propelled through gearing 130 simultaneously with tape 27 by motor 15. It is arranged that marker 126 shall be on the central line of tape 127 when there is no unbalance signal current in winding 111, that is, when trace 28 is itself central on tape 27 and mixer 116 is set at the center of its range.

When an unbalance voltage appears at control grid 104 of tube $V_6$, the resulting alternating voltage supplied to the grids of tubes $V_8$ and $V_9$ is supplied also to those of a double triode $V_7$, normally biased to cut-off by battery 128 connected between ground and the mid-point of resistor 129 which connects the grids of tube $V_7$. The grids of $V_7$ are driven positive in alternation by the voltage across the secondary terminals of transformer 105, so that in each half cycle of an unbalance voltage one or the other half of $V_7$ is conducting. Relay winding 122 in series with the joined anode-cathode circuits of $V_7$, is then traversed by a current which operates armature 120 to connect 60-cycle alternating source 113 (which may be the same as source 103) across winding 112 of motor M1. A condenser 122′ in parallel with winding 122 prevents chatter of armature 120. The excitation of winding 112 is then the same as the supply voltage, while that of winding 111 varies in phase with the unbalance voltage and in proportion to the magnitude thereof. Rotor 124 of motor M1 is then driven only when there is a difference in the conducting intervals of tubes $V_2$ and $V_3$, that is, when the trace 28 appears elsewhere than centrally on record 27, and it is arranged that this movement shall be in the sense to turn marker 126 in the direction to follow trace 28.

Motor M2 is a 2-pole motor such as the Kollsman No. 787-01, having a 2-phase stator and a 1-phase rotor. Its stator windings 134 are supplied with split phase from a 60-cycle source 114, which also may be the same as source 103. Rotor winding 135 is connected in series with the primary winding of transformer 93 which supplies the rectifier controlling the firing of tube $V_3$, normally at the beginning of each half cycle of the alternating current supply voltage.

It will be noted that for a complete rotation of mixer shaft 117, there is a quarter turn of shaft 125 and a half turn of shaft 136 controlling the position of rotor winding 135. There is thus a shift through one-half cycle (since motor M2 is 2-pole) of the phase of the voltage induced in rotor winding 135 for a complete rotation of mixer shaft 117, and through transformer 93 the firing time of tube $V_3$ is shifted a quarter-cycle earlier or later than the normal instant.

As above described, the appearance of such an unbalance voltage gives rise to motion of the rotor of motor M1, of mixer shaft 117 and marker 126, as well as of shaft 136. The connection between rotor 135 and transformer 93 is so made that the firing instant of tube $V_3$ is advanced if the conducting interval of tube $V_2$ is longer than that of $V_3$. $V_2$ fires only when the trace 28 interrupts the current in photocell 48 and continues conducting until extinguished by the firing of $V_3$; the latter is normally fired at each successive zero of the supply voltage but rotation of rotor 135 enforces firing of $V_3$ either earlier or later, advancing the firing if the conducting interval of $V_3$ is less than that of $V_2$, it being understood that the connection of winding 135 to the primary of transformer 93 is appropriately made.

An inequality in the conducting intervals of $V_2$ and $V_3$ thus gives rise to motion of shaft 117 to drive marker 126 from its central position on tape 127 in the direction corresponding to the momentary location of the trace on tape 27 and at the same time shifts the phase of the voltage generated in winding 135 to advance (or retard) as required the firing instant of tube $V_3$. The unbalance voltage at tap 97, corresponding in phase and magnitude to this inequality is reduced by the increase (or decrease) in the conducting interval of $V_3$, and disappears when $V_2$ and $V_3$ conduct for equal times. When this is so, the voltages to which condensers 78 and 88 are changed are equal, tubes $V_4$ and $V_5$ are equally conducting, no alternating voltage to ground appears at tap 97 and motor M1 comes to rest, armature 120 being returned to connect battery 115 across field winding 112.

Rotor 124 of motor M1 drives shaft 117 and its associated pulleys through clutch 137, normally engaged but disengageable by a slight upward motion of shaft 117 imparted by gripping knob 138, the mixer setting control. With clutch 137 so disengaged, the mixer operator may intervene to revise the trace being made on tape 127; this trace would otherwise be a duplicate of trace 28 made in the first reproduction of film 10. By this intervention the operator may change the attenuation of mixer 116 and at the same time shift marker 126 and rotor 135 to the corresponding positions, thereby making a revised trace on tape 127 and adjusting accordingly the voltage phase across the primary of transformer 93.

On the operator's releasing knob 138, the automatic control of shaft 117 is resumed. Obviously, one may effect a similar result by erasing and redrawing the pencil trace 28 on tape 27.

The adjustment of the system shown in Fig. 5 is made as follows:

Tape 27 is stopped when trace 28 is central, or is replaced by a dummy record on which a lengthwise center line is ruled. Clutch 137 is disengaged, the setting of mixer 116 is made central, marker 126 is centered on the new tape 127 and rotor 135 of motor M2 is set to make correct the phase of the voltage supplied to transformer 93, so that the conducting intervals of tubes $V_2$ and $V_3$ shall be equal.

Under these conditions, tube $V_3$ fires at the beginning of each scan, tube $V_2$ at the center thereof, and no signal appears at tap 97. The reproducing mixer shaft 117 is then firmly belt connected to the shaft of marker 126 and to that of rotor 135. Clutch 137 is reengaged, and no operation of motor M1 occurs.

If tape 27 is now restarted (or reinserted if a dummy record has been used) and the pencil trace 28 appears earlier than centrally, $V_2$ fires and is conducting for more than half of one half cycle of the alternating voltage supply. $V_3$ then fires at the next zero of the supply voltage, but its conducting interval is less than half the whole interval of scanning. An error voltage appears at tap 97 and drives motor M1, shaft 117 and rotor 135 to advance the phase of voltage supply to tube $V_3$ until it shall fire as much earlier than the beginning of a scan as the trace 28 is ahead of the center line of tape 27. The error voltage then disappears, the conducting times of $V_2$ and $V_3$ having been made equal.

The operation of the system of Fig. 5 may be illustrated as follows, assuming the position of trace 28 initially at the center of tape 27 and moving toward the edge of that tape where scanning begins:

Expressed in angular measure, the duration of a single scan is 180 degrees with respect to supply line frequency. The center of tape 27 is at 90 degrees from the commencement of the scan, which will be called 0 degrees. $V_3$ fires at 0 degrees, is extinguished by the firing of $V_2$ at 90 degrees and then refires at 180 degrees, extinguishing $V_2$. $V_2$ and $V_3$ are conducting each during 90 degrees.

Let the trace now appear at 60 degrees. $V_3$ is conducting for only 60 degrees, $V_2$ for 120 degrees. The error voltage advances the phase of $V_3$ to make it fire at −30 and at 150 degrees. $V_2$ again fires at 60 degrees but is extinguished by the refiring of $V_3$ at 150 degrees. The conducting intervals of $V_2$ and $V_3$ are again equal, but each interval is shifted 30 degrees earlier with respect to the scanning.

At all times when there is no error signal, relay 122 connects the fixed phase field winding of motor M1 to a direct current source and thus effectually brakes motor M1.

It is, of course, arranged that the motion of the shaft of motor M1 shall turn, through their respective belts, the shafts of motor M2 and of the pencil recorder 126 by the required amounts. A complete traverse of mixer shaft 117 needs to produce only a 180-degree phase shift in the voltage supplied to transformer 93 and only a 90-degree swing of marker 126. If no revision is needed of the sequence of volume levels decided on at rehearsal, the new trace is a duplicate of that used in controlling the reproduction. Under this condition a new trace record need not be made since the existing record may be reused indefinitely.

What is claimed is:

1. In a system of apparatus for reproducing a sound record, means for automatically controlling the reproduced sound level including a level control means, an auxiliary record comprising a tape bearing a lengthwise trace the transverse position of which on the tape continuously indicates the desired setting of the level control means, means for progressing the auxiliary record in synchronism with the reproduction of the sound record, optical means for continuously scanning the trace, electrical means controlled by the scanning means for deriving a first and a second voltage proportional respectively to the distances of the trace from one and from the other edge of the tape, means for deriving a third voltage proportional to the difference of the first and second voltages, servo-motor means operating in response to the third voltage to establish equality of the first and second voltages and means controlled by the servo-motor means to set the level control means.

2. A system of apparatus as in claim 1 including means for disabling the control of the level control means by the servo-motor means.

3. A system of apparatus as in claim 2 including means for making a second auxiliary record on which the lateral portion of a lengthwise trace indicates the setting of the level control means in the course of the reproduction of the sound record.

4. In a sound reproducing system, means for the automatic control of the reproduced sound level comprising a level control means, a tape bearing a lengthwise trace of which the transverse position on the tape indicates the desired setting of the level control means, optical means for scanning the trace, means for progressing the tape relatively to the scanning means, electrical means controlled by the scanning means for establishing an alternating voltage of amplitude and phase respectively corresponding to the extent and direction of departure of the trace from a reference line lengthwise of the tape, servomotor means controlled by the alternating voltage to set the level control means in accordance therewith and electrical means controlled by the servo-motor means to annul the alternating voltage concomitantly with the setting of the level control means.

5. In a sound reproducing system, means as in claim 4 for the automatic control of the reproduced sound level, wherein the electrical means controlled by the scanning means includes means for establishing a first and a second direct current voltage proportional respectively to the transverse distances of the trace from one and from the other edge of the tape, a source of alternating voltage and means for varying the voltage from the source in phase and amplitude in accordance with the sign and magnitude of the difference between the first and the second direct current voltage.

6. In a system of apparatus as in claim 1, a scanning system comprising a source of light, a plurality of optical systems, means for rotatably supporting the optical systems cylindrically about an axis intersecting the light source and angularly equally spaced thereabout, said optical systems serving successively and overlappingly to direct light from the source to illuminate an area normal to the axis and to direct toward the axis light reflected from the area, a photoelectric cell arranged to receive the reflected light and means for rotating the supporting means.

7. In a system of apparatus as in claim 1, a scanning system comprising a source of light, a plurality of optical systems, means for rotatably supporting the optical systems cylindrically about an axis intersecting the light source and angularly equally spaced thereabout, said optical systems serving successively and overlappingly to direct light from the source to illuminate an area normal to the axis and to direct toward the axis light reflected from the area, a photoelectric cell arranged to receive the reflected light, a source of alternating current and a motor driven thereby to rotate the supporting means at a speed such that the product of the revolutions per second and the number of optical systems equals twice the frequency of the alternating current.

8. In a system of apparatus of the kind described including a tape bearing a lengthwise trace varying in transverse position in correspondence with the varying setting of a level control means, means for progressing the tape synchronously with the reproduction of a sound record and optical means adapted to scan repetitively the transverse position of an element of the trace, means for deriving a first and a second voltage continuously proportional respectively to the distances of the element from one and from the other edge of the tape comprising a circuit including a photoelectric cell for translating the successive scannings of the element into voltage pulses of like polarity, means controlled from the source to drive the optical means to scan transversely the tape once in each half cycle of said current beginning near a given edge of the tape at each zero of said current, a pair of electrical discharge tubes, power supply for said tubes, means including a full-wave rectifier for supplying from the alternating current a rectified voltage to one of said tubes whereby said one tube is fired at each zero of the current, a circuit interconnecting said tubes whereby either thereof is extinguished on the firing of the other, means for applying the voltage pulse corresponding to the scanning of the element to fire the other of said tubes thereupon extinguishing said one tube, whereby the conducting interval of said one tube is proportional to the distance of the element from the beginning of a scan while the conducting interval of the other tube is proportional to the distance of the element from the end thereof and a time constant circuit in series with each tube including a condenser charged by the current therethrough to a voltage proportional to the conducting interval thereof.

9. A system of apparatus for automatically controlling the sound level in the course of reproduction of a sound record including a level control means, an auxiliary record comprising a tape bearing a lengthwise trace, the transverse position of which on the tape continuously indicates the desired setting of the level control means, means for progressing the auxiliary record in synchronism with the reproduction of the sound record, optical means adapted to scan repetitively the lateral position of an element of the trace, a source of alternating current, means controlled by the source to drive the optical means to scan transversely the tape once in each half cycle of the alternating current beginning near a given edge of the tape at each zero of said current, a circuit including a photoelectric cell for translating into voltage pulses of like polarity successive scannings of the element of the trace, a pair of gas-filled tubes, power supply for said tubes, a circuit interconnecting said tubes whereby either thereof is extinguished on the firing of the other, a full wave rectifier, means including phase shifting means for supplying to the rectifier in variable phase voltage from the source, means for supplying the rectifier output voltage from the rectifier to one of said tubes whereby said one tube is fired at each zero of the alternating voltage supplied by the rectifier, means for applying the voltage pulse corresponding to a scanning of the element to fire the other of said tubes thereby extinguishing said one tube, a resistance in series to ground with each tube, a time constant circuit including a condenser in shunt with each said resistance whereby each condenser is charged by the current through the corresponding tube to a voltage proportional to the conducting interval thereof, means for modulating the voltage from the alternating current source in accordance with the difference between the voltages of the condensers to derive an alternating voltage proportional to said difference and of phase corresponding to the sign thereof, means for amplifying the derived voltage, servo-motor means controlled jointly by a fixed phase of the alternating current and by the amplified derived voltage to alter the phase of the alternating voltage supplied to the rectifier to make equal the conducting intervals of the tubes thereby reducing to zero the derived voltage and means for setting the level control means in accordance with the operation of the servo-motor means.

10. In a system of apparatus including means for establishing a first and a second direct current voltage of the same polarity to ground, means for deriving an alternating voltage of amplitude proportional to the difference of the direct current voltages and a phase corresponding to the sign of the difference including a source of alternating voltage, a first and a second vacuum tube having each at least a cathode, a control grid, a second grid and an anode, said cathodes being grounded through a common resistor and said anodes being coupled by a second resistor, power supply for said tubes including a source of anode voltage supplied through an impedance to the electrical midpoint of the second resistor, means for applying the alternating voltage in push-pull to the two second grids and means for applying the first and second voltages individually to the control grids of said tubes.

11. Apparatus for automatically setting a control means in accordance with a prearranged sequence comprising a graphical record of the sequence in the form of a tape bearing a lengthwise trace the transverse position of which varies in accordance with the sequence of desired settings of the control means, optical means for transversely scanning the tape, means for progressing the tape relatively to the scanning means, a source of direct current voltage. an electrical circuit including a photoelectric cell responsive to the scanning of the tape for deriving from the source a first and a second direct current voltage respectively proportional to the distance of the element of the tape from the beginning and from the end of a scanning, a source of alternating voltage, means for modulating the alternating voltage in phase and amplitude in accordance with the sign and magnitude of the difference between the direct current voltages, means for amplifying the modulated voltage, servo-motor means controlled by the amplified voltage to set the control means relatively to a reference position thereof in accordance with the sign and magnitude of the difference of the direct current voltages and electrical means controlled by the servo-motor for varying the second voltage to equality with the first voltage concomitantly with the setting of the control means.

12. The method of automatic control of the reproduction of an original sound record which comprises making a first electrical reproduction of the sound record under manual control and simultaneously making a graphical record of the variation in manual control during the first reproduction, making a second electrical reproduction of the sound record under control of the graphical record jointly with manual control and simultaneously making a second graphical record of the variation in joint control during the second reproduction, and utilizing the revised graphical record thus obtained for the automatic control of subsequent electrical reproductions of the sound record.

13. The method of rerecording with automatic control an original sound record which comprises making a first electrical reproduction of the sound record under manual control and simultaneously making an erasable graphical record of the variation in manual control during the first reproduction, amending the graphical record by erasure and redrawing as desired, electrically reproducing the sound record under control of the amended graphical record and simultaneously making a second erasable graphical record of the variation in control by the amended record, and rerecording the sound record under control of the second graphical record.

14. The method of rerecording an original sound record which comprises making a first electrical reproduction of the sound record with variable efficiency, varying as desired the efficiency during said reproduction and simultaneously making a graphical record of the variation in efficiency, making a sound electrical reproduction of the sound record with variable efficiency and simultaneously scanning the graphical record to translate the indications thereof into electrical signals controlling the efficiency during the second reproduction and recording a final sound record in accordance with the second reproduction.

ARTHUR L. HOLCOMB.

REFERENCES CITED

The following references are of record in the file of this patent:

UNITED STATES PATENTS

| Number | Name | Date |
|---|---|---|
| 1,446,246 | De Forest | Feb. 20, 1923 |
| 1,975,928 | Eldred | Oct. 9, 1934 |
| 2,228,643 | Rudkin | Jan. 14, 1941 |